United States Patent

[11] 3,585,314

[72] Inventor Tadeusz Korn
Brussels, Belgium
[21] Appl. No. 766,081
[22] Filed Oct. 9, 1968
[45] Patented June 15, 1971
[73] Assignee Staar Societe Anonyme
Brussels, Belgium
[32] Priority Oct. 9, 1967
[33] Belgium
[31] 704863

[54] FACILITY FOR COMPENSATING CROSS-TALK IN MULTITRACK MAGNETIC HEADS
6 Claims, 5 Drawing Figs.

[52] U.S. Cl. .......... 179/100.2, 340/174.1
[51] Int. Cl. .......... G11b 5/44, G11b 5/28
[50] Field of Search .......... 179/100.2 C, 100.2 K, 100.2 MD; 340/174.1

[56] References Cited

UNITED STATES PATENTS

| | | | |
|---|---|---|---|
| 2,727,096 | 12/1955 | Singer .......... | 279/100.2 |
| 2,806,092 | 9/1957 | Livadary .......... | 179/100.2 |
| 2,986,608 | 5/1961 | Pettus et al. .......... | 179/100.2 |

OTHER REFERENCES

Hennis, R. B., " Cross Channel Coupling," IBM Tech. Bul., Vol. 1, No. 5, Feb., 1959, p. 26; Copy /N 179- 100, 2 MI

*Primary Examiner*—James W. Moffitt
*Attorney*—Waters, Roditi, Schwartz & Nissen

ABSTRACT: A magnetic tape reading facility for compensating crosstalk between tracks including a switch arrangement for selectively coupling impedances to the reading heads and coils to generate voltages equal and opposite to the crosstalk voltages.

FACILITY FOR COMPENSATING CROSS-TALK IN MULTITRACK MAGNETIC HEADS

The invention relates to magnetic head reading facilities comprising a number of readers which are simultaneously in contact with different tracks of a magnetic recording tape.

It is known that cross talk can occur in multitrack magnetic heads, and, more particularly, in miniature heads, owing to stray magnetic coupling between adjacent readers. Such cross talk is particularly objectionable when the tracks read simultaneously from the magnetic tape carry signals which are incompatible, i.e. which relate to completely different programs.

In such cases while a separation of more than 40 db. is desirable between two adjacent readers, it is generally difficult to obtain in conventional miniature magnetic heads more than 25 decibels separation between such adjacent readers.

An object of the invention is to provide an improved facility for compensating crosstalk between adjacent readers in multitrack magnetic heads.

A further object of the invention is to provide an improved cross talk compensating facility which can be adapted to all multitrack magnetic heads simply by adjusting the value of its components to the characteristics and structure of the head reading components.

A still further object of the invention is to provide a facility for compensating the crosstalk in multitrack heads, the facility being regulated by the component which selectively connects the different channels of the head to the amplifying components.

A facility provided in accordance with the invention comprises means which generate a voltage in each reader coil circuit, the voltage being equal in amplitude but opposite in phase to the crosstalk voltage induced in the winding by the stray magnetic flux produced when other tracks are read by adjacent readers. The facility is characterized in that the compensation voltage is produced by connecting the terminals of each coil of the stray flux-generating readers to ground, one terminal being connected across a common impedance and the other terminal being connected across a load impedance.

Figure 1:
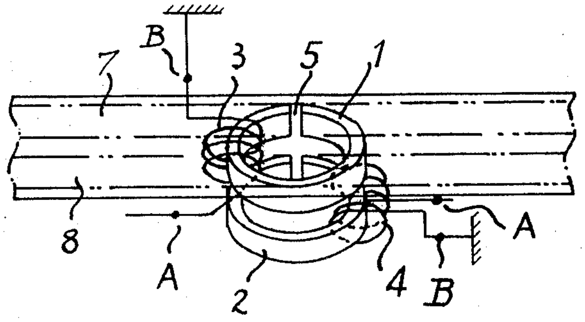

Referring next to the drawing, FIG. 1 shows a magnetic head comprising two readers connected in conventional manner. Each reader comprises a magnetic ring 1 and 2 respectively and a coil 3 and 4 respectively.

When the gap 5 in magnetic ring 1 is opposite the recording track 7, the track induces a magnetic flux in ring 1, varying in value as the band moves with respect thereto. The variations of magnetic flux in ring 1 produce a voltage in coil 3 which gives the desired readout, which is derived from track 7, at terminal A of coil 3.

It is found, however, that stray flux from ring 1 penetrates into the adjacent ring 2, with the result that reader coil 4 of track 8 derives a crosstalk signal from track 7, whereas coil 3 derives a crosstalk signal from track 8.

Figure 2:
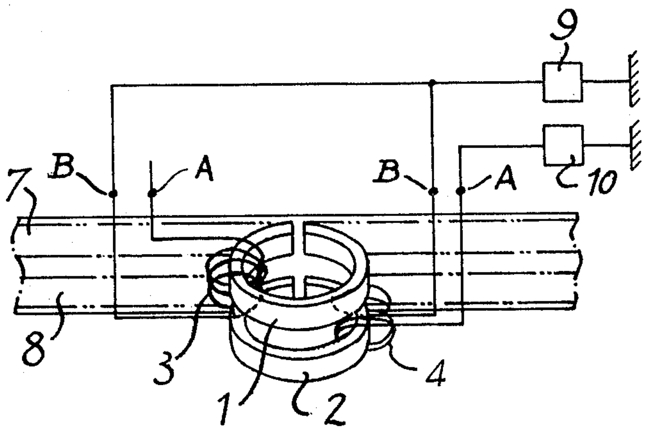

The facility according to the invention shown in FIG. 2 compensates the crosstalk by applying a voltage to the circuit of coil 3, the voltage being equal in amplitude but of opposite phase to the voltage induced in coil 3 by the stray magnetic flux produced when track 8 is read by ring 2.

Compensation is reciprocal, so that when terminal A of coil 3 is connected to load impedance 10, the facility operates in the same manner on the circuit of coil 4, so as to counterbalance the stray magnetic flux produced when track 7 is read by ring 1. The compensating voltage is applied by connecting terminal B of coil 3 and terminal B of coil 4 to ground across a common impedance 9.

If it is desired to collect the signal obtained when track 7 is read by a reader ring and coil (hereinafter called reader (1,3) and to reject the interference caused by the simultaneous reading of track 8 by reader ring and coil (hereinafter called reader (2,4)), terminal A of coil 3 is used as the signal supply source, and terminal A of coil 4 is connected across a load impedance 10 connected to ground.

The movement of track 8 produces an electromotive force in coil 4, with the result that a current flows through the circuit consisting of the common impedance 9, the coil 4, and the load impedance 10, thus causing a voltage drop across common impedance 9.

If the value of common impedance 9 is suitably chosen with respect to the value of load impedance 10, allowing for the internal impedance of coil 4 and the stray magnetic coupling coefficient ($k$) between readers (1,3) and (2,4), the resulting voltage across common impedance 9 is made equal in amplitude and opposite in phase to the crosstalk voltage induced in coil 3 by the leakage flux from ring 2.

The ratio between the values is expressed by the formula:

$\bar{Z}_9=(\bar{Z}_i+\bar{Z}_{10})\ (1-k)$ in which: $k$ is the coefficient of stray magnetic coupling between adjacent readers, $\bar{Z}_i$ is the internal impedance of coil 4, $\bar{Z}_9$ is the common impedance, and $\bar{Z}_{10}$ is the loading impedance of coil 4.

Figure 3:
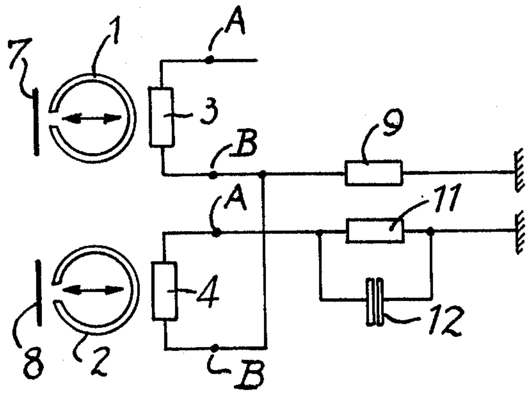

A sufficient approximation to the aforementioned formula can be obtained for example, if the common impedance 9 is a resistance and the load impedance 10 is a resistance 11 shunted by a capacitor 12. This circuit is illustrated in FIG. 3.

When the tracks of a magnetic tape carry programs for selection by a facility disconnecting the readers of temporarily unwanted tracks, the selection facility according to the invention comprises switching contacts connecting loading contacts 10 across the inoperative readers, impedances 10 being selected from the aforementioned formula, allowing for the magnetic coupling coefficient $k$ between a particular unwanted reader and the operating reader.

Figure 4:
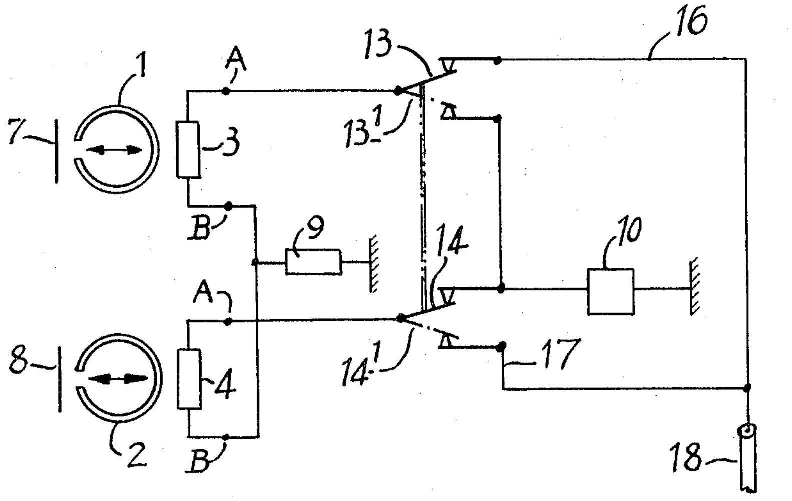

FIG. 4 illustrates how the facility is applied to the simple case where a selection is made between two adjacent tracks 7 and 8 carrying incompatible programs.

If it is desired to collect the signal obtained when track 7 is read by reader (1,3) and to suppress the stray effect when track 8 is read, the signal is supplied by terminal A of coil 3. Terminal A accordingly is connected via changeover switch 13 and conductor 16 to a conductor 18 connected to an amplifier. Terminals B of coils 3 and 4 are connected to ground across the common impedance 9, and terminal A of coil 4 is connected to ground across loading resistance 10 by changeover switch 14.

The position of changeover switches $\mathbf{13^1}$ and $\mathbf{14^1}$ indicated by broken lines in FIG. 4 represents the facility when it is desired to collect the signal obtained when track 8 is read by reader (2,4) and to eliminate the crosstalk caused by the reading of track 7. In the latter case, the signal is supplied by terminal A of coil 4, which is accordingly connected via changeover switch $\mathbf{14^1}$ and conductor 17 to conductor 18. Terminals B are again connected to ground via common impedance 9, and this time terminal A of coil 3 is connected to ground across load impedance 10 by changeover switch $\mathbf{13^1}$.

Figure 5:
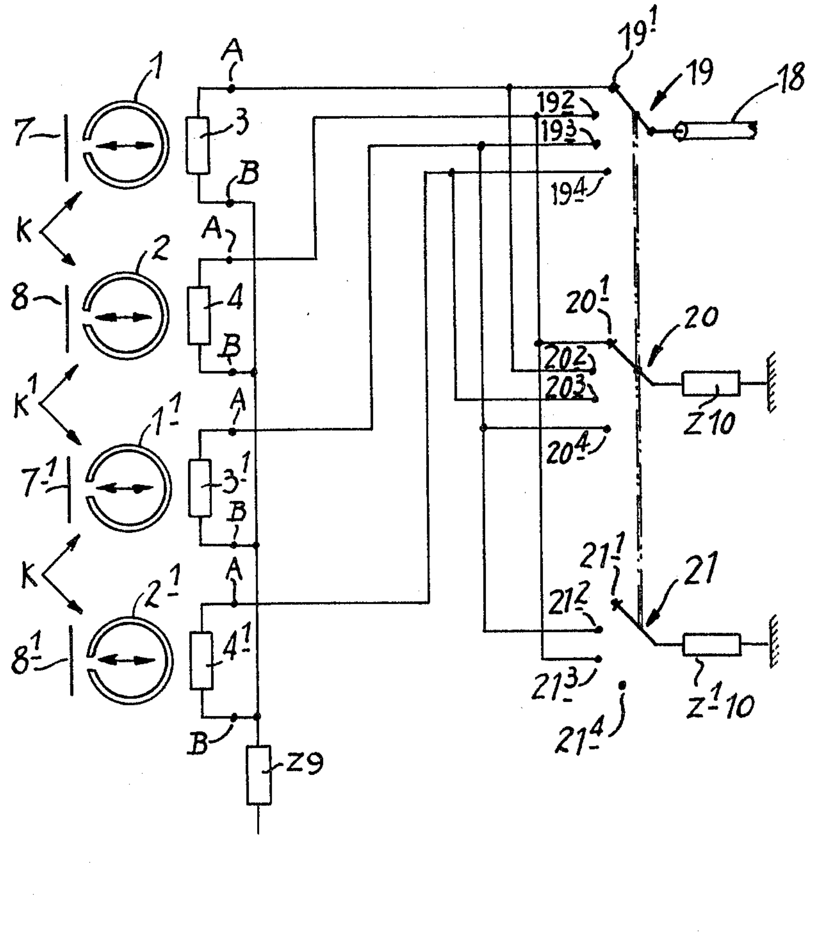

FIG. 5 shows the application of the facility to the more complex case in which the selection has to be made from among four tracks 7, 8, $\mathbf{7^1}$ and $\mathbf{8^1}$ carrying incompatible programs and read by a multitrack head having a magnetic coupling coefficient ($K$) between readers (1,3) and (2,4) and between readers (1,3) and $\mathbf{2^1}$, $\mathbf{4^1}$) and a different magnetic coupling coefficient ($K'$) between readers (2,4) and ($\mathbf{1^1}$, $\mathbf{3^1}$).

According to the formula, the magnetic coupling coefficient ($k'$) corresponds to a load impedance $\bar{Z}^1_{10}$. The terminals A of the four readers can be connected one at a time to output conductor 18 by a changeover switch 19. They can also be connected by a switch 20 to a load impedance $\bar{Z}_{10}$ connected to ground. Terminals A of readers (2,4) and ($\mathbf{1^1}$, $\mathbf{3^1}$) can also be connected to load impedance $\bar{Z}^1_{10}$ connected to ground, via a switch 21.

All the terminals B are connected to ground across the common impedance $\bar{Z}_9$.

FIG. 5 shows that when it is desired to collect the signal obtained when track 7 is read by reader (1,3) and to suppress the stray effect when track 8 is read, switches 19, 20 and 21 occupy positions $\mathbf{19^1}$, $\mathbf{20^1}$, $\mathbf{21^1}$.

If it is desired to collect the signal obtained by reading track 8, $\mathbf{7^1}$ or $\mathbf{8^1}$, switches 19, 20 and 21 occupy positions $\mathbf{19^2}$, $\mathbf{20^2}$ and $\mathbf{21^2}$ or $\mathbf{19^3}$, $\mathbf{20^3}$ and $\mathbf{21^3}$ or $\mathbf{19^4}$, $\mathbf{20^4}$ and $\mathbf{21^4}$, respectively.

It is immediately obvious that when the switches are in positions $19^2$, $20^2$ and $21^2$, terminal A of reader (2,4) is connected to the amplifier via switch $19^2$, at the same time as terminal A of reader (1,3) is connected to ground across load impedance $\bar{Z}_{10}$ by switch $20^2$ and terminal A of reader $1^1$, $3^1$ is connected to ground across load impedance $\bar{Z}^1_{10}$ by switch $21^2$, with the result that the crosstalk produced in reader (2,4) is adapted to the coupling coefficients $k$ and $k'$ between the reader (2,4) used and readers (1,3) and ($1^1 3^1$) respectively.

I claim:

1. A facility providing for compensating of crosstalk and comprising multitrack magnetic heads, circuits including reader coils operatively associated with said heads, said coils and associated heads constituting respective readers, and means for generating a compensation voltage in the circuit of each reader coil, one of the heads being selectively an active head to read a signal from an adjacent track, the compensating voltage being equal in amplitude but opposite in phase to a crosstalk voltage induced in the coil associated with the active head by stray magnetic flux from an adjacent inactive head, said means including an impedance common to said coils and a load impedance for each respective coil selectively associated with said adjacent inactive head, each said coil including a pair of terminals, one of the terminals of the coil of the adjacent active head being adapted for connection to a signal supply source, the other terminal of the latter said coil and one terminal of the coil associated with the adjacent inactive head being connected across said common impedance and the other terminal of the coil associated with the adjacent inactive head being connected across said load impedance.

2. A facility according to claim 1 comprising selection means which selectively disconnects the readers of the tracks, and switches coupled with the selection means to connect load impedances across the disconnected readers, the load impedances having values corresponding to the magnetic coupling coefficient between each crosstalk generating reader and the active reader.

3. A facility according to claim 2, wherein the selection means includes switches whereby when readout is selected from a number of tracks read by a multitrack head between whose readers there is a stray magnetic coupling of various values 1$k$ and $k'$), and when the readout is selected by one said switch, other of the switches connect the disconnected terminal to the common impedance of the coil of each of the adjacent readers and are coupled with a load impedance $\bar{Z}_{10}$ or $\bar{Z}_{10}$) which corresponds to the coupling coefficient between the reader selected and each adjacent reader.

4. A facility according to claim 1 wherein the common impedance has a value with respect to that of the load impedance, allowing for the internal impedance ($Z_i$) of the crosstalk voltage generating reader coil and the stray magnetic coupling coefficient between the active and adjacent readers, such that the voltage generated across the common impedance is equal in amplitude and opposite in phase to the crosstalk voltage.

5. A facility according to claim 4, wherein the ratio between the values of the impedances is expressed by the formula:

$\bar{Z}_9 = \bar{Z}_i + \bar{Z}_{10})(1-k)$ in which:

$K$ is the stray magnetic coupling coefficient between the active and adjacent readers, $\bar{Z}_1$ is the internal impedance of the stray flux-generating reader coil, $\bar{Z}_9$ is the common impedance, and $\bar{Z}_{10}$ is the load impedance.

6. A facility according to claim 5, wherein the common impedance is a resistance and the load impedance includes a resistance and a capacitor parallel to the latter said resistance.